March 1, 1960

W. SCHWARTZ ET AL 2,926,870

STABILITY COMPENSATOR

Filed Nov. 7, 1956

INVENTORS.
RICHARD H. KLEPINGER
WALTER SCHWARTZ
BY
ATTORNEY
AGENT

INVENTORS.
RICHARD H. KLEPINGER
WALTER SCHWARTZ

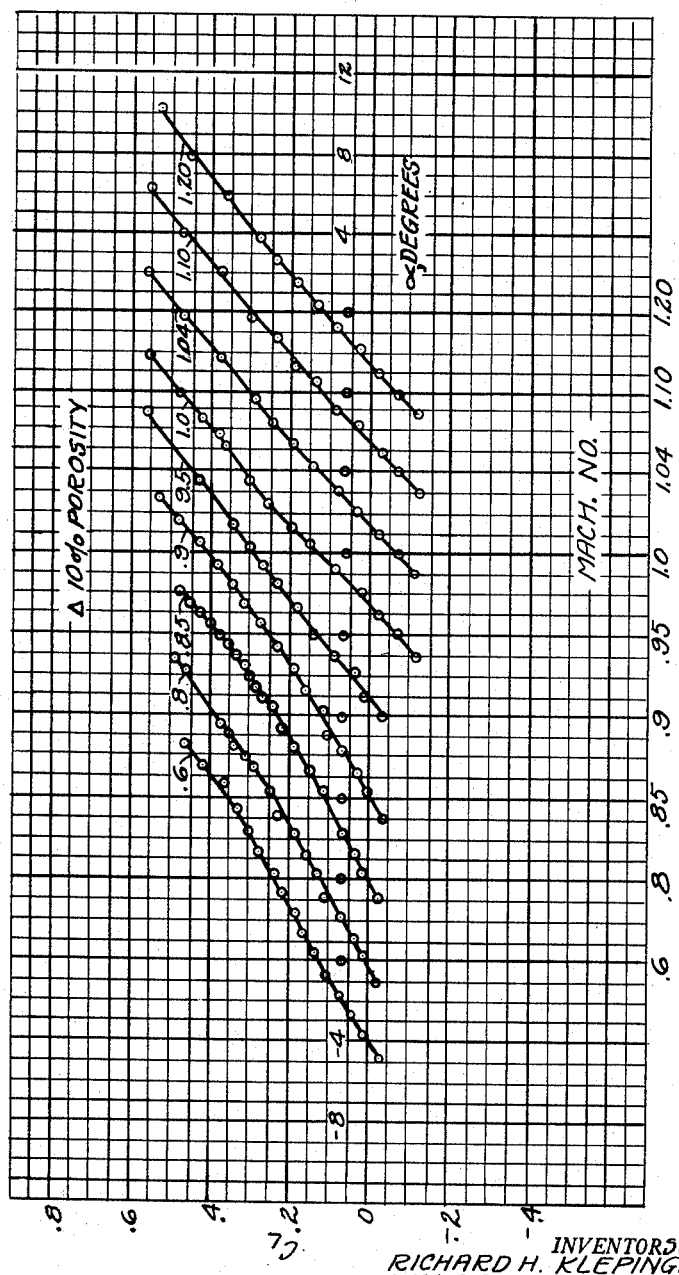

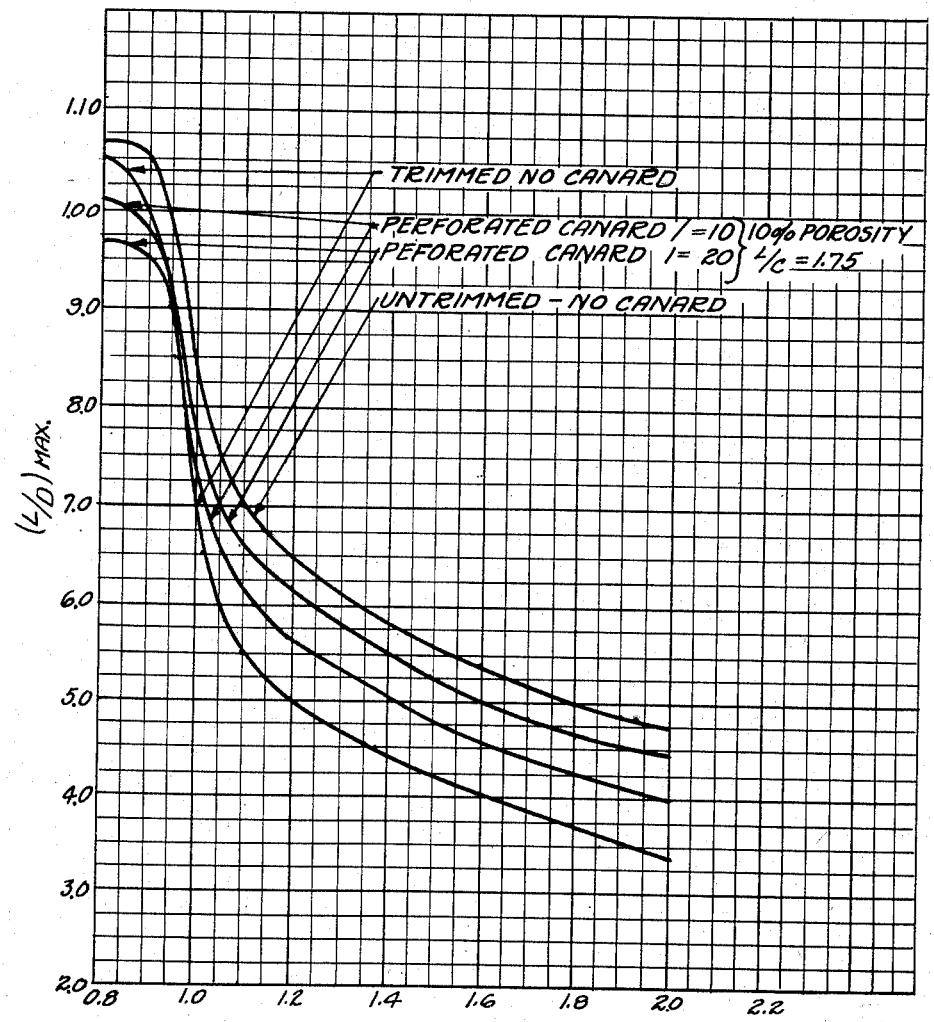

United States Patent Office 2,926,870
Patented Mar. 1, 1960

2,926,870

STABILITY COMPENSATOR

Walter Schwartz, Torrance, Calif., and Richard H. Klepinger, Dayton, Ohio, assignors to the United States of America as represented by the Secretary of the Air Force Application November 7, 1956, Serial No. 620,990

5 Claims. (Cl. 244—45)

(Granted under Title 35, U.S. Code (1952), sec. 266)

The invention described herein may be manufactured and used by or for the United States Government for governmental purposes without payment to us of any royalty thereon.

This invention relates to aircraft and missiles designed to operate at supersonic speeds, and more particularly to the effect of the addition of a canard surface to said aircraft and missiles.

In the design of supersonic aircraft and missiles, one of the chief problems of the designer involves stability particularly in the transonic and supersonic speed ranges. It has been found that as the aircraft or missile increases its speed from the subsonic to the transonic and finally to the supersonic speed ranges, a considerable rearward shift occurs in the aerodynamic center of the main lifting surface. Since in most cases, the center of gravity of said aircraft or missile is set by the subsonic stability margin, the aircraft or missile becomes excessively stable about the lateral axis in the upper speed ranges. This excessive longitudinal stability at the higher speed ranges requires large deflections in the control surfaces utilized for the purpose of trim which, in turn, increases the control hinge moments. Most important, said large control deflections effect a large increase in the drag-due-to-trim. The latter consists of two parts, the drag due to the control deflection and the drag due to the additional lift of the wing resulting from a large down load on said control surface. It is the reduction of the drag-due-to-trim with which the present invention is primarily concerned.

One solution of the problem of excessive longitudinal stability has involved the transfer or pumping of fuel into the rear fuel tanks in order to shift the center of gravity and thereby compensate for the rearward shift in the aerodynamic center. Such a solution, however, involves a complicated pumping system and associated structure which is feasible only for the larger long-range types of aircraft.

A second solution for eliminating or, at least, substantially reducing the large rearward shift in the aerodynamic center would be to provide a canard surface positioned or mounted forward of the aircraft or missile center of gravity. Said canard surface may be mounted horizontally and arranged to be free-floating in the subsonic speed ranges and locked in position in the transonic and supersonic speed ranges. This type of canard arrangement involves the design of a complex locking system which would ensure that said canard surface is always in the free-floating condition should damage or a failure of any kind occur. Naturally, such a design is to be avoided where possible.

An object of the invention, therefore, resides in the utilization of a canard surface of a unique type mounted on the forward portion of the aircraft or missile to act as a destabilizing element at transonic and supersonic speeds.

A further object of the invention is to equip the aircraft or missile with a canard surface that is effective at the upper speed ranges only and, yet, eliminates the use of complex or moving parts.

A still further object of the invention provides a canard surface mounted forward of the center of gravity of the main lifting surface and relatively ineffective at subsonic speeds.

Another object of the invention is in the use of a perforated canard surface effective at supersonic speeds to reduce the usual large rearward shift in the aerodynamic center of the aircraft and missile.

An additional object of the invention is the provision of a perforated canard surface mounted forward of the center of gravity of the aircraft or missile to reduce the stability margin at supersonic speeds and thereby reduce the drag-due-to-trim.

Other objects and advantages of the invention will become apparent from the following description, taken in connection with the accompanying drawings in which like reference characters refers to like parts in the several figures:

Figs. 3 and 3a represent graphs of lift coefficient versus angle of attack at various Mach numbers for a zero porosity and a 10% porosity delta-wing, respectively, illustrating the effect of perforations on the lift curve slope.

Fig. 5 represents a plurality of graphs illustrating the effect of a perforated canard surface on the maximum lift/drag ($L/D$) ratio as compared to the aircraft in either a trimmed or untrimmed condition.

It is noted that the following description is made with reference to wind tunnel tests of delta-wing models having specific dimensions and aerodynamic data merely for the sake of comparison of results. The invention, therefore, may be applied to other wing fuselage configurations without departing from its spirit or scope. The important aspect of the invention is that a perforated canard surface is utilized with a supersonic aircraft or missile to act as a destabilizing element at the higher Mach numbers. Said element has been developed as a result of the serious difficulty of excessive longitudinal stability encountered at the higher speed ranges, this difficulty being caused by a large rearward shift in the aerodynamic center of said aircraft or missile which, in turn, necessitates large deflections in trimming surfaces followed by a substantial increase in the drag-due-to-trim.

Figure 1:
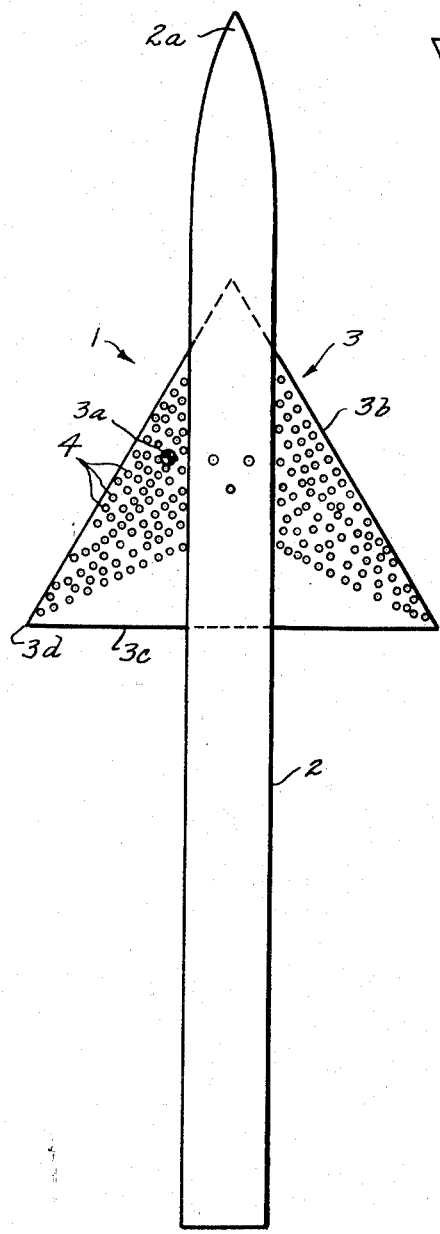
Fig. 1 is a plan view of the delta wing configuration utilized in the invention illustrating the arrangement of a perforated control surface as applied to an aircraft or missile.

With particular reference to Fig. 1 of the drawings, a delta canard fuselage configuration is generally illustrated at 1. Said configuration consists of an aluminum alloy body or fuselage 2 and a canard lifting surface 3. The canard lifting surface 3 as utilized in the tests has an aspect ratio of 2.3, a thickness ratio of 4% (root chord), and a flat plate airfoil section having a round leading edge and a tapered trailing edge. Said body or fuselage 2 was 40.53 inches in length, had a constant diameter of 3 inches, and a nose portion 2ª having a tangent ogive of 8.88 calibers. As clearly seen in Fig. 1, the canard lifting surface 3 is of delta configuration. The latter was mounted with the quarter chord point 3ª of its mean aerodynamic chord (M.A.C.) 4.85 body diameters or 14.55 inches aft of said nose portion 2ª and on the horizontal centerline of said body or fuselage 2. The leading edge 3ᵇ of said wing or lifting surface 3 is swept back through an angle of 60 degrees, and is rounded to a smooth faired curve from the 15% chord line to said leading edge. The aft portion of said surface 3 is tapered from the 75% chord line to the trailing edge 3c to a thickness of 0.1 inch of said trailing edge 3c and in addition, said surface 3 has a constant thickness between the 15% and 75% chord lines with the exception of a small region of the wing tips 3d. The latter are tapered in thickness spanwise to approximately 10% of the semi-span.

The canard lifting surface 3 of the above described delta planform is illustrated in Fig. 1 as being perforated to the extent of 10% porosity. To obtain 10% porosity, the canard lifting surface 3 is divided into two (2) parts and each half thereof is divided into 10 equal areas (excluding the portion covered by the body or fuselage 2) running chordwise. Ten (10) holes or perforations (indicated at 4) .192 inch in diameter are drilled in each equal area between the 10% and 70% chord lines, 67% of which are laid out between the 10% and 40% chord lines for a total of 100 holes per half wing. Obviously, the porosity can be changed to some extent merely by changing the diameter of the holes 4, as for example, increasing their diameter to 0.271 inch for 20% porosity.

Figure 3:
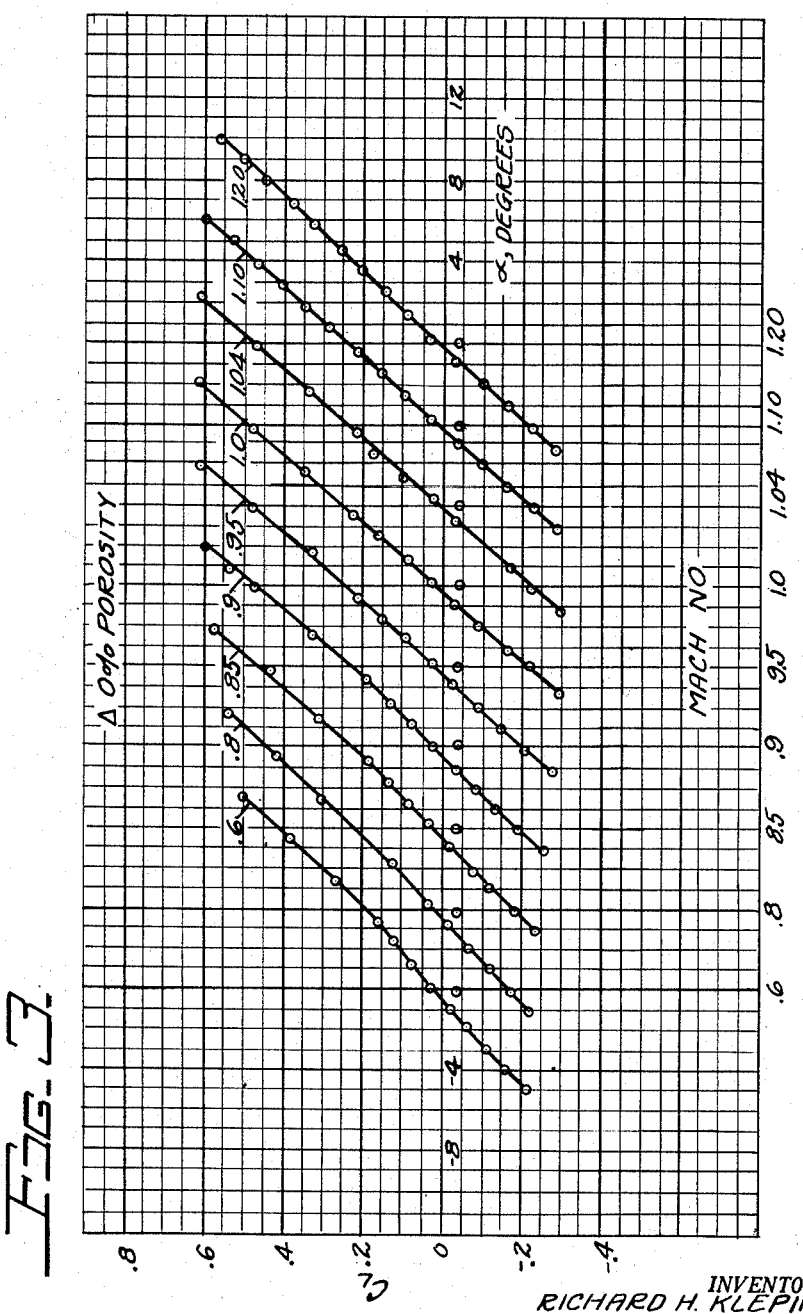

The lift of the delta wing configuration as a function of angle of attack at various Mach numbers is plotted in Figures 3 and 3a. In Figure 3, a zero porosity lifting surface or wing 3 is utilized whereas in the latter figure a 10% porosity wing is plotted. A comparison of Figure 3a with Figure 3 illustrates that the addition of perforations as at 4 in said lifting surface or wing 3 reduces the lift curve slope in the subsonic region considerably more than in the supersonic region. Said lift curve slope is defined as the average slope over the range of angle of attack from 0° to 6°. In operation, the perforations 4 provide or permit the flow of air through the surface 3 to reduce the lift curve slope of said surface 3 at subsonic speeds while, at the same time, maintaining good effectiveness at the higher speeds. Furthermore, the effective porosity of said perforated surface 3 substantially decreases as the parallel flow velocity is increased to the higher Mach numbers. Therefore, for a given static pressure difference between the upper and lower surfaces of the wing 3, an increase in the parallel flow velocity effects a decrease in the flow of air through the perforations 4.

Figure 2:
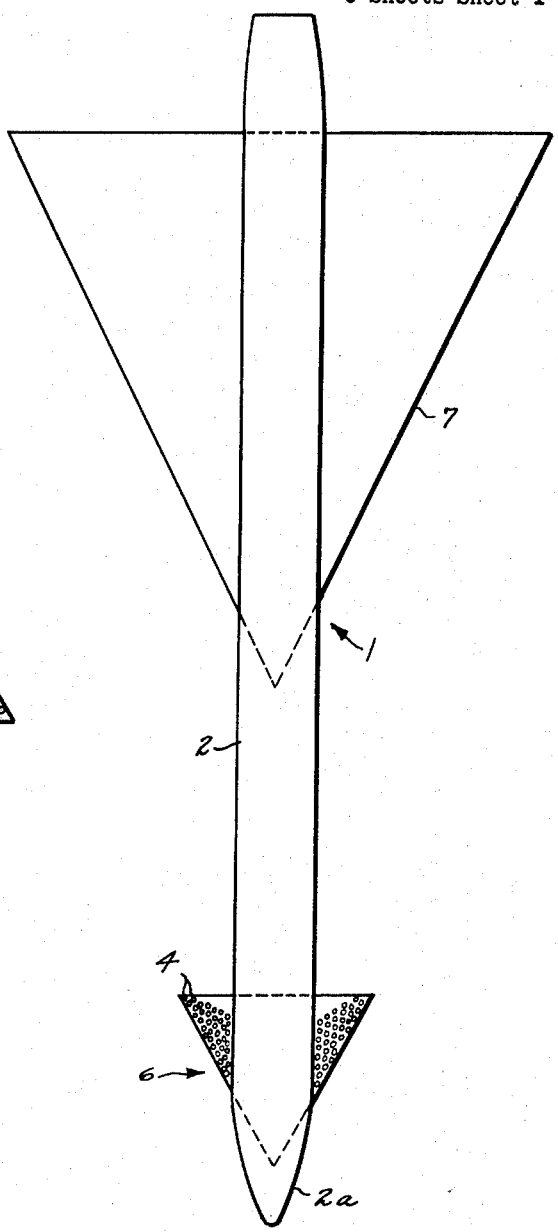
Fig. 2 is a plan view of a typical delta wing configuration utilized in the invention to illustrate the arrangement of a nonperforated wing with the addition of a perforated canard control surface on the forward or nose portion thereof.

As clearly seen in Figure 2 of the drawings, the perforated canard surface 6 has been mounted on the forward or nose portion 2a of said tailless delta wing fuselage configuration 1, the latter consisting of said body or fuselage 2 and a main lifting surface or wing 7.

Various arrangements wherein the relative size and location of the canard surface were studied and are listed below in the following table:

| $Sc/Sw$ | $\overline{Lc/c}$ | Percent Porosity |
|---|---|---|
| 0.05, 0.10, 0.15, 0.20 | 1.75 | 10 |
|  | 1.75 | 20 |
|  | 1.75 | 25 |
|  | 1.25 | 10 |
| 0.25 | 1.75 | 10 |
|  | 1.25 | 10 | where $Sc/Sw$ represents the ratio between the area of the canard surface 6 and the total area of the delta wing 7, $\overline{Lc/c}$ represents the relation between the distance (Lc) from the center of pressure (C.P.) of said canard surface 6 and the center of gravity of the airplane, and $\bar{c}$ represents the mean aerodynamic chord of the wing.

With all of the above configurations investigated a stability margin of 5% M.A.C. at a Mach number of 0.80 was utilized. This defined the center of gravity (C.G.) for each arrangement.

The maximum lift-drag ratio, $L/D$ maximum, and minimum drag, $C_{D_0}$, may be computed as follows for each configuration at a Mach number of 1.2:

Total drag, $$C_D = C_{D_0} + \frac{(\Delta C_D)}{(C_L^2)wf} C_L^2 wf + \frac{(\Delta C_D)}{(C_L^2)c} \cdot C_{L_c}^2 \frac{Sc}{Sw} + (C_D) \text{ trim}$$

where $C_{D_0}$, the minimum drag, may be computed by adding the drag of the canard surface 6 to the drag of the basic delta wing configuration plus the drag due to the holes 4 as determined by wind tunnel results $$\frac{(\Delta C_D)}{(C_L^2)wf}$$

the untrimmed drag-due-to-lift of the basic configuration, may be obtained from experimental data $$\frac{(\Delta C_D)}{(C_L^2)c} C_{L_c}^2 \frac{Sc}{Sw}$$

the drag-due-to-lift of the perforated canard surface 6 is determined by computation using wind tunnel results to determine the ratio $$\frac{(\Delta C_D)}{(C_L^2)c}$$

and the last term $(C_D)$ trim, the drag due to trim may be computed as follows:

$$(C_D) \text{ trim} = \frac{(\Delta C_D)}{(C_L^2)wf} \cdot C_L^2 wf(E-1)$$

where E is a function of the ratio of stability margin to the distance from the center of gravity (C.G.) to the center of pressure (C.P.) of the control surface.

It is therefore, determined that the trim drag, $C_D$ trim, increases with an increase in Mach number due to the accompanying increase in stability margin.

Next, the aerodynamic center may be computed for each configuration at a Mach No. of 0.80 and then the movement in the aerodynamic center of the wing-fuselage due to the canard surface 6 is computed as follows:

$$(\Delta ac)c = \frac{(C_L \alpha)c}{(C_L \alpha)wf} \bar{v}$$

where $(C_L\alpha)c$ is the lift curve slope of the canard surface 6 in the presence of the body 2 and is obtained from experimental data. $(C_L\alpha)wf$ is the lift curve of the basic delta wing configuration 1 and $$v = \frac{Sc}{Sw} \frac{1c}{\bar{c}}$$

where $$\frac{Sc}{Sw}$$

is the ratio of canard surface 6 area to wing surface 7 area $$\frac{1c}{\bar{c}}$$

is the ratio of the distance from the center of pressure (C.P.) of said canard surface to the center of gravity, and $\bar{c}$ is the mean aerodynamic chord.

Figure 4:
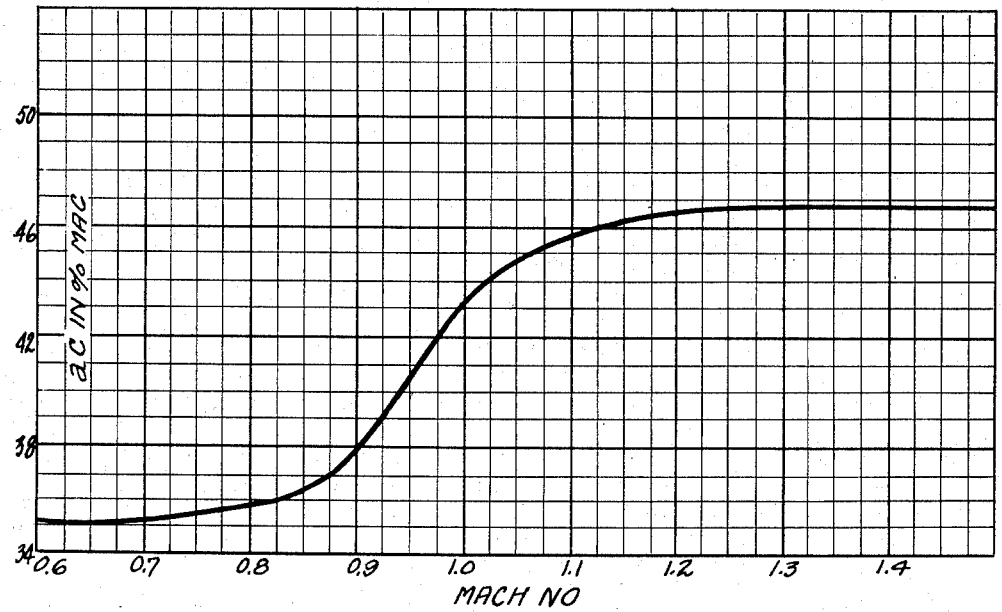
Figs. 4 and 4a represent graphs of Mach number versus the aerodynamic center of the tailless delta-wing configuration and the effect of perforations on the increment in aerodynamic center, respectively.
Figure 4A:
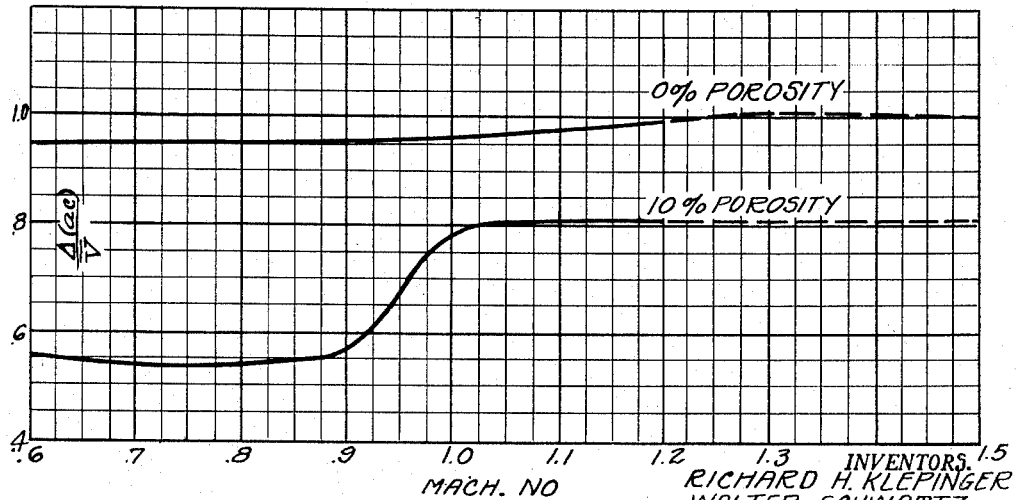

This increment $(\Delta ac)c$, is then subtracted from the aerodynamic center of the wing-fuselage. In this regard, with particular reference to Figure 4 of the drawings, there is illustrated the effect of Mach number on the aerodynamic center of the tailless delta-wing aircraft 1 wherein a large rearward shift occurs as said aircraft increases in speed from the subsonic to the transonic and supersonic speed ranges. Figure 4a discloses the effect of the addition of the perforated canard surface 6 of 10% porosity on said increment, $(\Delta ac)c$, in aerodynamic center. Next, the location of the center of gravity of said configurations is determined in the usual manner by assuming a 5% stability margin at a Mach number of 0.8 (C.G.=ac−.05) and the distance from the center of gravity, C.G., to the center of pressure of the elevon, $1_t$, is computed. The stability margin at any Mach number may be determined by referring to Figures 4 and 4a. The total lift coefficient, $C_L$, may likewise be computed and then utilized to compute the maximum lift-drag ratio as follows:

$$(L/D)\ max. = \frac{1}{2\sqrt{C_{D_0}\frac{(dC_d)}{(dC_L^2)}}}$$

where $C_{D_0}$ is the zero lift drag coefficient and $$\frac{(dC_D)}{(dC_L^2)}$$

is the final trimmed drag due to lift factor for the particular configuration which is obtained by differentiating the total drag equation with respect to $C_L^2$ as follows:

$$C_D = C_{D_0} + \frac{C_L^2}{\left\{1+\frac{(\Delta ac)c}{\bar{v}}\frac{Sc}{Sw}\right\}^2}\left\{\left(\frac{\Delta C_D}{C_L^2 wf}\right)E + \frac{(\Delta C_D)}{(C_L^2)c}\left(\frac{(\Delta ac)c}{\bar{v}}\right)^2\frac{Sc}{Sw}\right\}$$

$$\frac{dC_D}{dC_L^2} = \frac{\left(\frac{\Delta C_D}{C_L^2 wf}\right)E + \frac{\Delta C_D}{(C_L^2)c}\left[\frac{(\Delta ac)c}{\bar{v}}\right]^2\frac{Sc}{Sw}}{\left\{1+\left[\frac{(\Delta ac)c}{\bar{v}}\right]\frac{Sc}{Sw}\right\}^2}$$

With particular reference to Figure 5 of the drawings, the effect of Mach number on the maximum lift-drag ratio is plotted for the tailless delta wing configuration 1 as shown in Figure 2 of the present invention. A careful analysis of said Figure 5 reveals that the addition of the 10% porosity canard surface 6 to the basic trimmed delta wing configuration 1 produced a substantial increase in $L/D$ at supersonic speeds. Moreover, an increase in maximum $L/D$ of 10%–25% over the trimmed basic configuration is realized at supersonic speeds by using the perforated canard surface 6 to reduce the trim drag. Although 20% and 25% porosity surfaces were also tested, the 10% porosity canard surface 6 produced the greatest improvement in $L/D$ due to the lower drag of this surface.

Thus, the perforated canard surface of the instant invention is unique and yet simple and effective in operation, and used as a trim device on supersonic aircraft and missile configurations appreciably reduces the shift in aerodynamic center at high Mach numbers as well as improving the maximum lift-drag ratio at supersonic speeds approximately 10%–25%. In addition, the present invention involves an effective use of perforations to substantially reduce the lift of a horizontal surface at subsonic speeds while maintaining good supersonic lift capabilities to act as a destabilizing element at transonic and supersonic speeds.

We claim:

1. A tailless delta wing aircraft comprising a streamlined body, a main lift surface of delta configuration mounted on the rearward portion of said body, a canard surface fixedly mounted on the forward portion of said body, and a plurality of perforations in said canard surface, the canard surface being relatively inoperative below a predetermined critical speed range and relatively operative above said critical speed ranges, said perforations providing passages for air flow through said canard surface below said critical speed range to reduce the effective lift of said canard surface and inherently ineffective as air passages above said critical speed range to maintain good lift effectiveness in said canard surface adding an increment in aerodynamic center to reduce the large rearward shift in aerodynamic center normally occurring in said aircraft above said critical speed.

2. In a high speed aircraft having a tailless delta wing-fuselage configuration, and a canard surface positioned forward of the center of gravity of said configuration, said canard surface being of delta configuration and perforated to the extent of 10% porosity, said perforations becoming increasingly effective at reduced speeds below a critical Mach number to reduce the effective lift of said surface and increasingly ineffective at higher speeds when the parallel flow velocity of air over said surface increases beyond said critical Mach number, said increase in velocity substantially decreasing the airflow through said perforations to appreciably increase the effective lift of said aircraft, said increase in the lift of said canard surface applied forward of said center of gravity acting as a destabilizer to substantially reduce the normally excessive stability inherent in said aircraft at speeds above said critical Mach number, said reduction in excesive stability effecting a substantial decrease in the control deflections of said aircraft required for trim and in the drag-due-to-trim.

3. A supersonic aircraft consisting of a relatively large main wing configuration mounted on the rearward portion thereof, and a relatively small stability compensator fixedly mounted on the forward portion thereof, said stability compensator comprising an auxiliary perforated delta canard surface relatively ineffective at subsonic speed and relatively effective at supersonic speeds to reduce the normally relatively large stability margin, said reduction in stability margin resulting from a plurality of perforations of predetermined value in said surface to provide a plurality of air passages therein effective at subsonic speeds to reduce the lift of said surface and ineffective at supersonic speeds to provide an additional lifting surface adding an increment to the aerodynamic center of said main wing to reduce the rearward movement in said aerodynamic center with relation to the aircraft center of gravity.

4. In a high speed aircraft having a basic wing-fuselage configuration and excessive stability at supersonic speed, means for eliminating said excessive stability, said means comprising a supplementary canard surface mounted on the forward portion of said configuration at a fixed angle of incidence, and a plurality of perforations incorporated in said canard surface effective at subsonic speed to provide passages for air flow from the lower surface to the upper surface of said canard surface and inherently ineffective at supersonic speed to restrict the flow of air therethrough and provide additional lift for said aircraft, the additional lift on said canard surface effecting an increment in aerodynamic center in a direction forward of the center of gravity of said aircraft to reduce the rearward shift in the aerodynamic center of said basic wing-fuselage configuration.

5. In a tailless supersonic aircraft having a delta wing-fuselage configuration and being excessively stable at supersonic speeds, means for reducing the drag of said aircraft due to the excessively large control deflections normally required at said supersonic speeds, said large control deflections being required to overcome the excessive stability of said aircraft, said means comprising an auxiliary lifting surface fixedly positioned in the nose portion of said aircraft, said lifting surface having a porosity of a predetermined value which porosity is effective at subsonic speeds to permit the flow of air therethrough and reduce the effective lift of said surface and ineffective at supersonic speeds to effect a substantial lifting force on said surface to thereby effectively reduce said excessive stability and said large control deflections normally required to change the attitude of said aircraft at supersonic speeds.

References Cited in the file of this patent

UNITED STATES PATENTS

| | | |
|---|---|---|
| 1,767,944 | Schleusner | June 24, 1930 |
| 1,801,028 | Tucker et al. | Apr. 14, 1931 |
| 2,292,360 | Brewster | Aug. 11, 1942 |